(12) United States Patent
Le

(10) Patent No.: US 10,577,786 B2
(45) Date of Patent: Mar. 3, 2020

(54) UNIVERSAL FLAPPER

(71) Applicant: FLUIDMASTER, INC., San Juan Capistrano, CA (US)

(72) Inventor: Tuan Le, Fountain Valley, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 0 days.

(21) Appl. No.: 15/890,255

(22) Filed: Feb. 6, 2018

(65) Prior Publication Data

US 2018/0223511 A1 Aug. 9, 2018

Related U.S. Application Data

(60) Provisional application No. 62/455,196, filed on Feb. 6, 2017.

(51) Int. Cl.
*E03D 1/35* (2006.01)
*F16K 21/16* (2006.01)
*E03D 1/33* (2006.01)

(52) U.S. Cl.
CPC .............. *E03D 1/35* (2013.01); *E03D 1/33* (2013.01); *F16K 21/16* (2013.01)

(58) Field of Classification Search
CPC .. E03D 1/35; E03D 1/306; E03D 1/33; F16K 21/16; F16K 31/24
USPC .................................. 4/378, 382, 392, 393
See application file for complete search history.

(56) References Cited

U.S. PATENT DOCUMENTS

| | | | |
|---|---|---|---|
| 3,590,396 A * | 7/1971 | Graziosi ................... | E03D 1/34 4/393 |
| 4,593,419 A * | 6/1986 | Derus ....................... | E03D 1/34 4/324 |
| 4,811,432 A * | 3/1989 | Harris ...................... | E03D 1/144 4/393 |
| 5,205,000 A * | 4/1993 | Xia .......................... | E03D 1/306 4/324 |
| 8,943,620 B2 | 2/2015 | Schuster et al. | |
| 9,181,687 B2 | 11/2015 | Schuster et al. | |
| 2008/0201833 A1* | 8/2008 | Scruggs .................. | E03D 1/306 4/393 |
| 2015/0197928 A1* | 7/2015 | McHale .................. | E03D 1/306 4/423 |
| 2017/0030065 A1* | 2/2017 | Bucher ..................... | E03D 9/02 |

* cited by examiner

*Primary Examiner* — Tuan N Nguyen

(74) *Attorney, Agent, or Firm* — Greenberg Traurig, LLP

(57) ABSTRACT

Some embodiments include a fluid control assembly with a flapper canister, a linkage rotatably coupled to the flapper canister and to a support of a mount. In some embodiments, the flapper canister can be angled with respect to the mount to enable the flapper canister to be coupled to various sizes, types and orientations of flush valves. In some embodiments, by rotating the linkage about pivots coupled to the flapper canister and the support and pivoting or rotating about a motion-enabling element coupling the mount and a support, the flapper canister can be raised, lowered, and/or rotated or pivoted enabling the flapper canister to be sealed against a flush valve orifice. In some embodiments, the flapper canister includes a buoyancy control tube providing fluid coupling between one side of the flapper canister to an opposite side and enabling buoyancy-assist to the position or motion of the flapper canister.

26 Claims, 6 Drawing Sheets

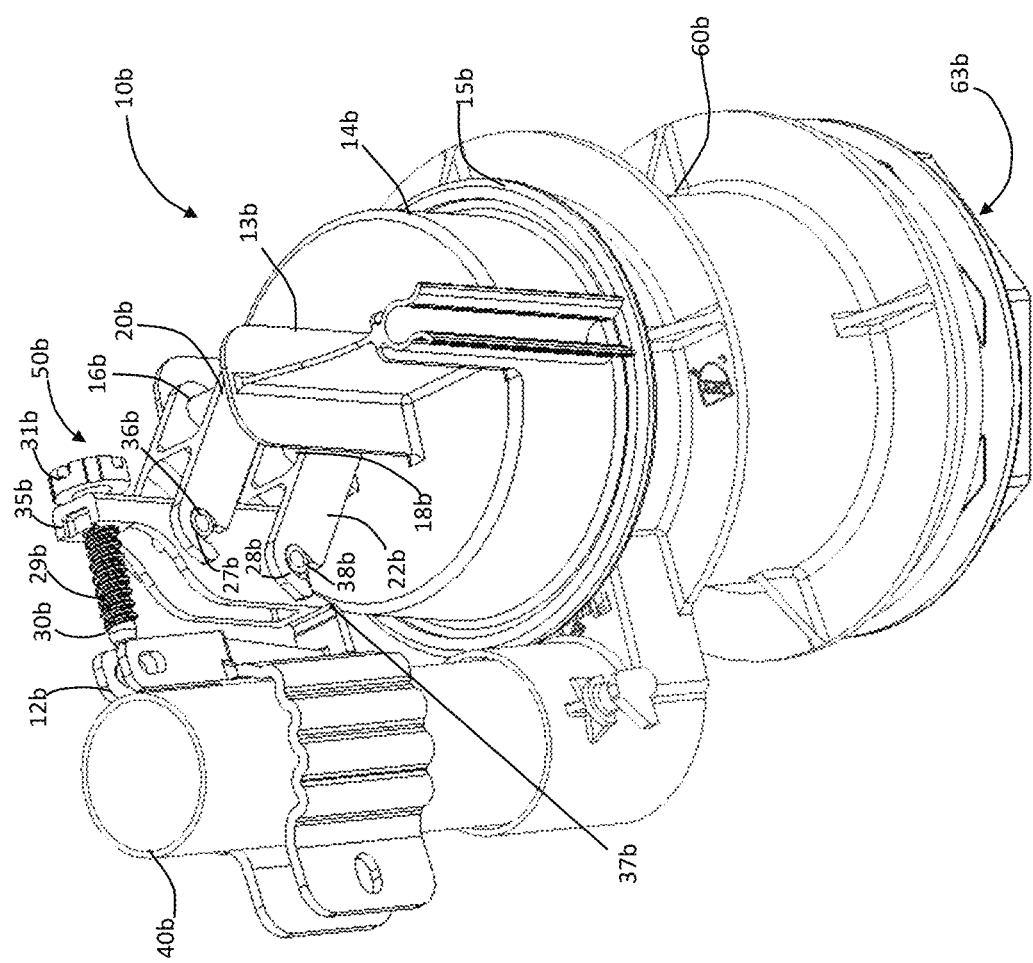

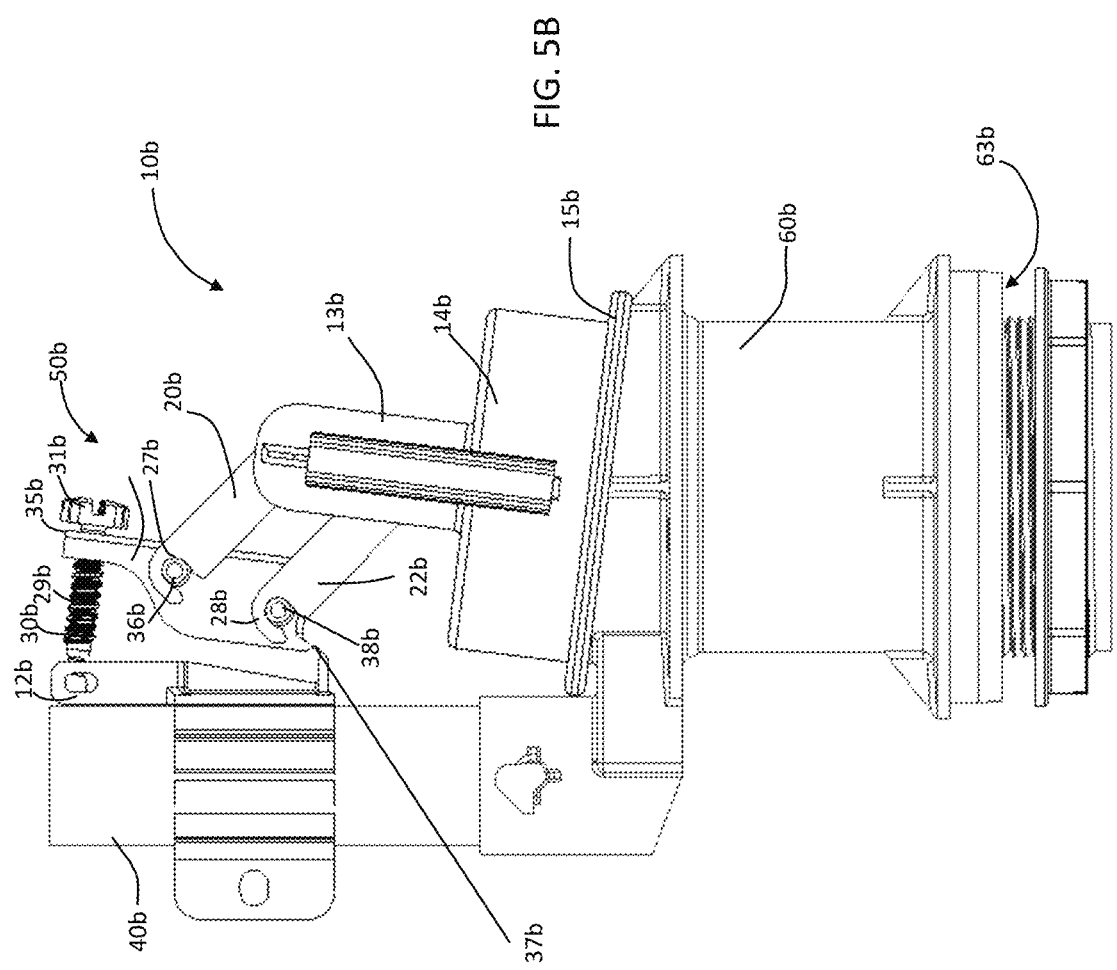

UNIVERSAL FLAPPER

RELATED APPLICATIONS

This application claims priority to U.S. provisional application Ser. No. 62/455,196, filed on Feb. 6, 2017, the entire contents of which are incorporated herein by reference.

BACKGROUND

Water is becoming an increasingly scarce and valuable commodity across the globe, which has led to an increase in legislation to conserve, curtail or limit water use. Consequently, there is an increasing need in the industry to develop fluid control systems (e.g., such as flush systems of toilet tanks, and other fluid handling or delivery systems) that improve fluid transfer precision and/or efficiency. As flush volumes are required to decrease, fluid flow characteristics must be enhanced to provide satisfactory flush performance.

Conventional ceramic manufacturing techniques do not provide the ability to maintain accurate dimensional control with small tolerances. The use of materials which can be fabricated with excellent dimensional control for those components where fluid flow characteristics must be carefully controlled could allow the use of less dimensionally well-controlled ceramic manufacturing technologies where toilet aesthetics, strength, and chemical wear durability are required.

A significant disadvantage of conventional rubber flappers are that they are "peeled back" to open the flush orifice. As such, water tends to flow into one side of the orifice of the flush valve more than the opposite side. Accordingly, it would be desirable to provide a flush valve assembly where a flapper does not block flow into the flush orifice when the flapper is lifted.

SUMMARY

A fluid valve control assembly comprising a flapper coupled to a linkage assembly that comprises at least one extension coupled or integrated with the flapper, and at least one first connector coupled to the at least one extension. Some embodiments include at least one linkage rotatably coupled to the at least one first connector at one end, and to at least one second connector at an opposite end. In some embodiments, the at least one second connector is rotatably coupled to a support of a mount. In some embodiments, the flapper and the at least one extension are configured and arranged to be raised, lowered, and/or pivoted by rotating the at least one linkage about the at least one first connector and the at least one second connector.

Some embodiments include a flapper that comprises a flapper canister. In some embodiments, the flapper is at least partially hollow. In some embodiments, the flapper canister has an open bottom end. In some embodiments, the mount is configured as an overflow tube mount and configured to be mounted to an overflow tube. In some embodiments of the invention, the bottom end of the flapper canister comprises a flange dimensioned to be positioned over an orifice of a flush valve.

Some embodiments of the invention include at least one linkage comprising at least one pair of bars. In some embodiments, at least two bars of the at least one pairs of bars are parallel. In some embodiments, the at least two bars remain parallel when rotating the at least one linkage about the at least one first connector and the at least one second connector.

In some embodiments, an adjustment screw is positioned through an aperture of the support and coupled to the mount. In some embodiments, a support is coupled to the mount by a hinge that is configured and arranged to enable the support to rotate or pivot about the hinge. In some embodiments, upon rotation of the adjustment screw, the support is configured and arranged to move along a thread of the adjustment screw and to rotate or pivot about the hinge, the movement resulting in a change of location of the flapper with respect to the mount or any surface or structure to which the mount is mounted. In some embodiments, the hinge comprises a living hinge.

Some embodiments include a flush valve having an open top orifice and an open bottom orifice, and an overflow tube extending upwardly from the flush valve. In some embodiments, the linkage assembly is configured to enable the flapper to remain parallel to the open top orifice of the flush valve as the flapper is raised and lowered.

In some embodiments, the flapper includes a flange. In some embodiments, the flange is configured to at least partially seal a flush valve orifice when the flapper lowered.

Some embodiments include a fluid control assembly comprising: a flapper canister, and at least one linkage rotatably coupled to the flapper canister and a support of a mount. In some embodiments, the at least one linkage comprises at least one pair of bars, where at least two bars of the at least one pairs of bars are parallel and remain parallel when rotating the at least one linkage about the pivots. In some embodiments, an adjustment screw is positioned coupled through the support and coupled to the mount. In some embodiments, a flapper canister is configured and arranged to be raised, lowered, and/or pivoted by rotating the at least one linkage about pivots coupled to the flapper canister and the support. In some embodiments, upon rotation of the adjustment screw, the support is configured and arranged to move along a thread of the adjustment screw resulting in a change of an angle of the flapper canister with respect to the mount. Some embodiments also include a flush valve having an open top orifice and an open bottom orifice, and an overflow tube extending upwardly from the flush valve; wherein the at least one linkage is configured to enable the flapper canister to remain substantially parallel to the open top orifice of the flush valve as the flapper canister is raised and lowered.

In some embodiments, the support is coupled to the mount by a motion-providing assembly configured and arranged to enable the support to rotate or pivot with respect to the mount. In some embodiments, the motion-providing assembly comprises a conventional hinge, a living hinge, a screw, an axle, a pivot, a link, a bearing, and/or a roller.

In some embodiments, the flapper or flapper canister includes a buoyancy control tube extending from an upper surface, and providing a fluid coupling between one side of the flapper to an opposite side. Further, in some embodiments, the buoyancy control tube is configured to provide a buoyancy-assist to the position or motion of the flapper or canister.

DESCRIPTION OF THE DRAWINGS

FIG. 5A is a perspective view of an embodiment having an optional adjustment mechanism that varies the angle of the flapper canister (as shown on a three inch flush valve) in accordance with some embodiments of the invention.

FIG. 5B is a side elevation view corresponding to FIG. 5A in accordance with some embodiments of the invention.

DETAILED DESCRIPTION

Figure 1B:
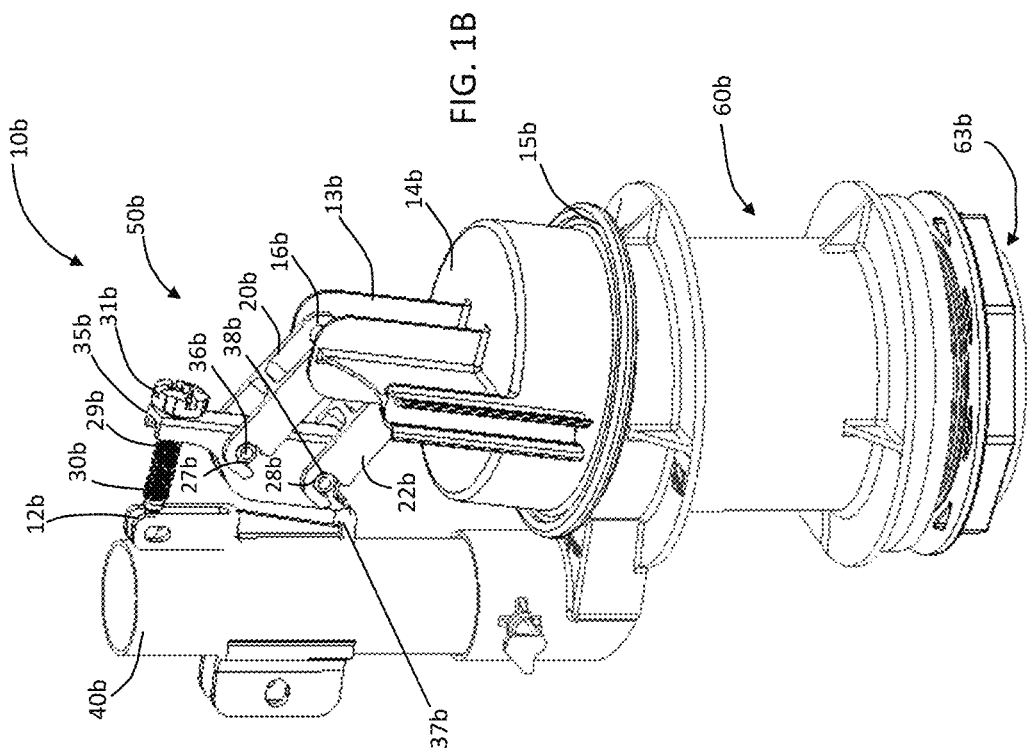
FIG. 1B is a perspective view of the flapper control assembly positioned on a flush valve in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments of the invention provide a control assembly for a conventional flapper in a flush valve (e.g., such as a plastic or rubber flapper). Some embodiments of the invention include an installed, pre-installed, integrated, and/or coupled control assembly. In some embodiments, any of the assemblies described herein can be coupled to a mechanical and/or hydraulic system interfacing with a surface (e.g., such as a ceramic surface) of a toilet (or other fluidic system) for the purposes of mounting and directing fluid as necessary and/or under control of a user. Some embodiments can include the at least a portion of the ceramic of a toilet or other fluid control device and/or fluid (e.g., such as fluid in the bowl of a toilet). In some embodiments, any of the assemblies described herein can utilize precision manufacturing (e.g., plastic or polymer molding, injection molding, or other conventional polymer fabrication methods).

In some embodiments, any of the assemblies described herein can be modular. For example, some embodiments include one or more sub-assemblies and/or one or more coupled components. In some embodiments, coupling or connection can be manual, intuitive, and with "no tools required", e.g. using techniques such as a snap, click, slide, insert, twist, push, pull, and other conventional coupling methods.

A further advantage of the system is that the flapper canister can be dimensioned to be large enough to fit over and seal any conventional flush valve opening (e.g., such as a two inch, and/or a three inch opening, or other conventional opening diameter), and represents at least one advantage or capability enable by the various embodiments described herein. Further, the ability for the flapper canister to be angled provides the ability for the flapper canister to be positioned over flush valve openings with various or differing opening angles in some embodiments of the invention. As a result, in some embodiments, the same flapper canister size can be used as a replacement for flush valves (e.g., such as either two inch or three inch flush valves, or other conventional sizes), and/or as new flush valves of any conventional sizes. In contrast, when a conventional flapper is used, the flapper must be precisely dimensioned to seal the orifice, and thus only a two inch flapper can be used with a two inch orifice, etc., a three inch flapper with a three inch orifice, and so on. To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

Some embodiments provide a fluid valve flapper assembly with a flapper canister that is coupled to an overflow tube using a linkage assembly that enables the angle of the flapper canister to be remain substantially constant and substantially parallel to the top orifice of the flush valve as the flapper canister is raised or lowered. In some embodiments, as the flapper canister is lowered, a seal can be formed that is substantially or completely parallel to the top orifice of the flush valve. Since the control assembly is not made of rubber, it will not degrade and leak over time (as is common with conventional flappers that need to be replaced periodically). In some further embodiments, a flapper structure such as a flap can be used in place of a flapper canister.

Some embodiments include a control assembly that comprises: (a) a fluid valve overflow tube mount; (b) a flapper canister having a bottom end; and (c) a pair of bars, wherein each bar is pivotally mounted to the fluid valve overflow tube mount at one end and to the flapper canister at another end. In some embodiments, the flapper canister can include a bottom flange dimensioned to be positioned over a flush valve orifice. In some embodiments of the invention, during operation, the pair of bars rotate together to raise or lower the flapper canister. In some embodiments, the flapper canister can therefore be kept in the same orientation as it is raised or lowered such that its bottom flange is kept substantially parallel to the top orifice of the flush valve assembly (i.e., where the rubber flapper traditionally sits). In some embodiments, the orientation of the flapper canister can be horizontal (i.e., parallel to the bottom of the tank). In other embodiments, the orientation can be tilted (i.e. at an angle) to the bottom of the tank.

Figure 1A:
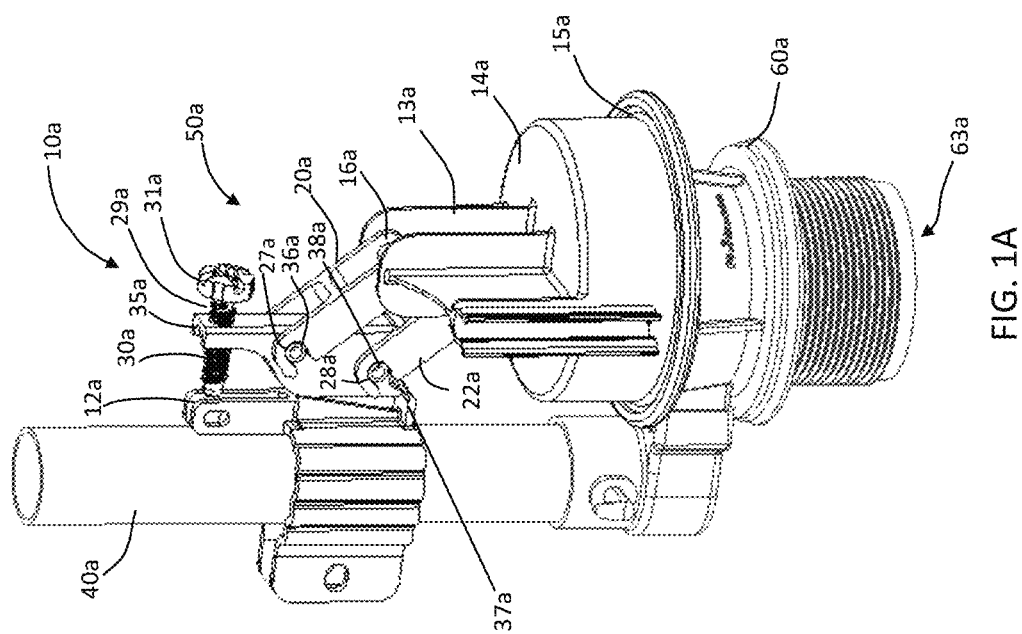
FIG. 1A is a perspective view of a flapper control assembly positioned on a flush valve in accordance with one embodiment of the invention.

Perspective views of the flapper control assembly include a first embodiment of a flush valve in FIG. 1A shown as fluid valve flapper control assembly 10*a*, and with figure element numbers including an "a" suffix). FIG. 1B shows a second embodiment comprising fluid valve flapper control assembly 10*b*, with figure element numbers including a "b" suffix. In reference to the first and second embodiments, in some embodiments of the invention, a mount 12*a*, 12*b* can be used to couple the fluid valve flapper control assembly 10*a*, 10*b* to a surface, component, and/or an assembly of components. For example, in some embodiments, the mount 12*a* and/or the mount 12*b* can comprise a fluid valve overflow tube mount that can be coupled onto an overflow tube 40*a*, 40*b*. In some embodiments, a flapper canister 14*a*, 14*b* can be coupled to a linkage assembly 50*a*, 50*b* comprising a linkage. Some embodiments include multiple linkage assemblies. In some embodiments, the linkage can comprises one or more connecting bars or structures. For example, some embodiments include at least one pair of bars 20*a*, 20*b* and/or 22*a*, 22*b*. As can be seen, in some embodiments, each bar 20*a*, 20*b* and 22*a*, 22*b* can be pivotally mounted to mount 12*a*, 12*b* by coupling to support 35*a*, 35*b* at one end, and to flapper canister 14*a*, 14*b* at another end by coupling to extension 13*a*, 13*b* of the flapper canister 14*a*, 14*b*. For example, in some embodiments, connector 16*a*, 16*b* coupled to the extension 13*a*, 13*b* of the flapper canister 14*a*, 14*b*, (with FIG. 5A showing connector 16*b* more clearly), can pivotably couple the bar 20*a*, 20*b* to the support 35*a* and the extension 13*a*, 13*b*. In some embodiments, a similar connector can couple the bar 22*a*, 22*b* to the mount (e.g., see connector 18*b* in the perspective view of FIG. 5A, and the connectors 18*a*, 18*b* in the front views of FIGS. 3A and 3B). In some further embodiments, other flapper structures including conventional flappers can be used in place of the flapper canister 14*a*, 14*b*. For example, some embodiments include conventional flapper covers, flapper bulbs.

In some embodiments, the bars 20*a*, 20*b* and 22*a*, 22*b* can be substantially parallel as shown in the non-limiting embodiments of FIGS. 1A and 1B. In some other embodiments, at least one of the bars 20*a*, 20*b* and 22*a*, 22*b* is not parallel with another. Further, in some embodiments, more or fewer bars can be used to accomplish the invention. For example, although the bars 20*a*, 20*b* each comprise two side bars with each side bar coupled to opposites of the support 35*a*, other embodiments can include either one or both of the bars 20*a*, 20*b* with a single side bar coupled to the support 35*a*. In some further embodiments, either one or both of the bars 20*a*, 20*b* can comprise more than two side bars, with any number of the side bars coupled to the support 35*a*. As used herein, the term "bars" is not limited to any particular shape, although in some embodiments, the bars comprise elongated shapes.

In some embodiments, flapper canister 14*a*, 14*b* can be a hollow structure with an open bottom end. In some other embodiments of the invention, the flapper canister 14*a*, 14*b* can be partially hollow or substantially solid (i.e., not hollow). In some embodiments of the invention, the bottom end of the flapper canister 14*a*, 14*b* can be at least partially closed or completely closed. In some embodiments, the bottom end of flapper canister 14*a*, 14*b* can comprise a flange 15*a*, 15*b* that is dimensioned to be positioned over a flush valve orifice, as shown. In some embodiments, the flange 15*a*, 15*b* can at least partially seal the orifice (and thus can replace a conventional flapper that would otherwise be received into the orifice, such a conventional rubber flapper). In some embodiments, the flapper control assembly 10*a*, 10*b* can replace a conventional flapper assembly, or the flapper control assembly 10*a*, 10*b* can be installed as a new component.

In some embodiments of the invention, portions of the fluid valve flapper control assembly 10*a*, 10*ab* can be moved, rotated, and/or titled with respect to other coupled and/or adjacent portions. For example, in some embodiments, the angle at which the flapper canister 14*a*, 14*b* is held by the linkage assembly 50*a*, 50*b* can be adjusted. As described earlier, in some embodiments, connector 16*a*, 16*b* can pivotably couple the bar 20*a*, 20*b* to the support 35*a*, 35*b* (and similarly connectors can couple the bar 22*a*, 22*b* to the support 35*a*, 35*b*, such as with the connector 18*b* in the perspective view of FIG. 5A). In some embodiments, one or more of the bars 20*a*, 20*b*, 22*a*, 22*b* can comprise at least one socket that can couple to a pivot extending from the support 35*a*, 35*b* that enables the bars 20*a*, 20*b*, 22*a*, 22*b* to pivot. For example, as shown in FIGS. 1A-1B, 2A-2B, 2C-2D, 4A-4B, and 5A-5B, bar 20*a* can include socket 27*a*, and bar 20*b* can include socket 27*b*. Further, bar 22*a* can include socket 28*a*, and bar 22*b* can include socket 28*b*. Further, in some embodiments, support 35*a*, 35*b* can include pivots 36*a*, 36*b*, 38*a*, 38*b*. Further, in some embodiments, the bars 20*a*, 20*b* can comprise the same or similar sockets at opposite ends to enable a pivot coupling at the connector 16*a*, 16*b*. Further, in some embodiments, the bars 22*a*, 22*b* can comprise the same or similar sockets at opposite ends to enable a pivot coupling a connector (e.g., such as connector 18*b* for bar 22*b*).

In some embodiments, an adjustment mechanism can be included to allow the linkage assembly 50*a*, 50*b* to be adjusted. In some embodiments, this can allow an adjustment of the angle at which the flapper canister 14*a*, 14*b* is positioned with respect to the top orifice 61*a*, 61*b* of flush valve 60*a*, 60*b* and/or an overflow tube 40*a*, 40*b*. For example, some embodiments include an adjustment screw 29*a*, 29*b*, positioned through an aperture in the support 35*a*, 35*b* and coupled to mount 12*a*, 12*b*. In some embodiments, the support 35*a*, 35*b* is coupled to the mount 12*a*, 12*b* by a screw or other pivoting or rotating structure such as hinge 37*a*, 37*b* that enables the support 35*a*, 35*b* to be extended towards or away from the mount 12*a*, 12*b* by rotating or pivoting about the hinge 37*a*, 37*b*. In some embodiments, the hinge 37*a*, 37*b* can comprise a living hinge (i.e. a flexible bearing), or other motion-providing assembly, including, but not limited to a conventional hinge, a screw, an axle, a pivot, a link, a bearing, and/or a roller. Further, this arrangement can align the centerline of the flapper canister 14a, 14b with the center of the valve orifice. In some embodiments, the screw or other pivoting or rotating structure can move within slots in bars to accommodate movement or adjustments as required.

In some embodiments, the screw 29a, 29b can comprise a thread 30a, 30b and a head 31a, 31b. In some embodiments, a user can use the head 31a, 31b to rotate the screw 29a, 29b, where rotation of the thread 30a, 30b through the aperture can enable the support 35a, 35b to move along the thread 30a, 30b and rotate or pivot about the hinge 37a, 37b. During this process, the angle of the bars 20a, 20b, 22a, 22b and the flapper canister 14a, 14b with respect to the fixed portions of the fluid valve flapper control assembly 10a, 10b can change. For example, socket 27a of bar 20a can pivot around pivot 36a, and/or socket 27b of bar 20b can pivot around pivot 36b. Further, socket 28a of bar 22a can pivot around pivot 38a, and/or socket 28b of bar 22b can pivot around pivot 38b. Further, bar 20a can pivot about connector 16a, and/or bar 20b can pivot about connector 16b, and/or bar 22a can pivot about a connector, and/or bar 22b can pivot about connector 18b. Further, as the support 35a, 35b moves move along the thread 30a, 30b it be extends towards or away from the mount 12a, 12b by rotating or pivoting the support 35a, 35b about the hinge 37a, 37b.

Figure 4B:
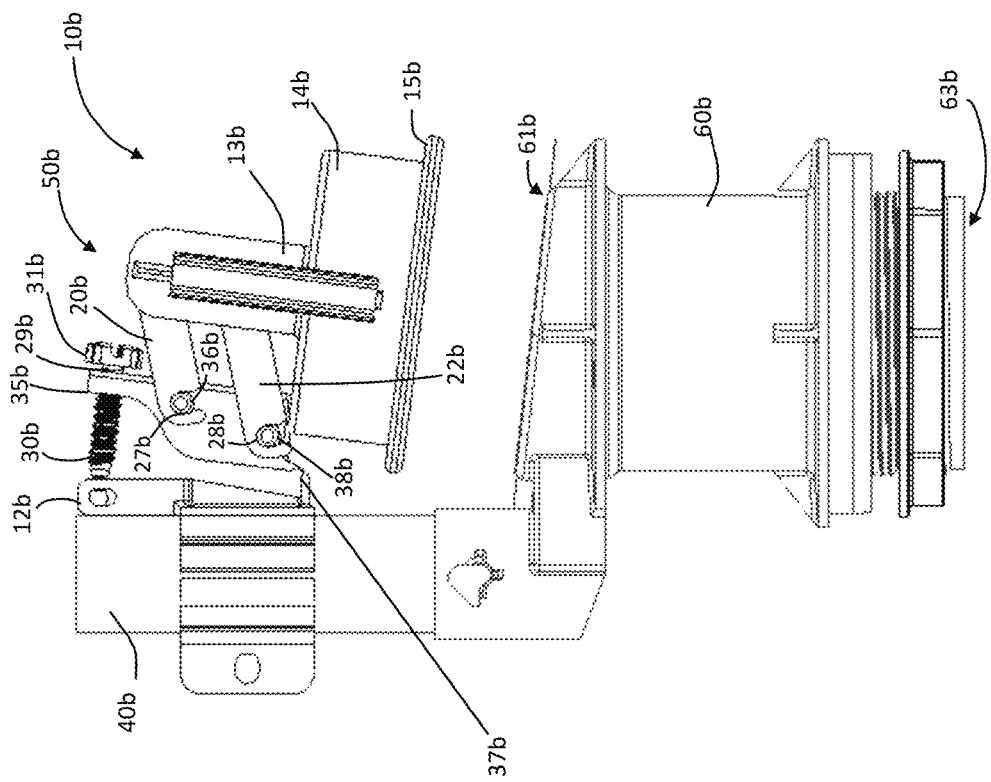
FIG. 4B is a side elevation view corresponding to FIG. 1B with the flapper canister in a raised position (thereby permitting a flush) in accordance with some embodiments of the invention.
Figure 4A:
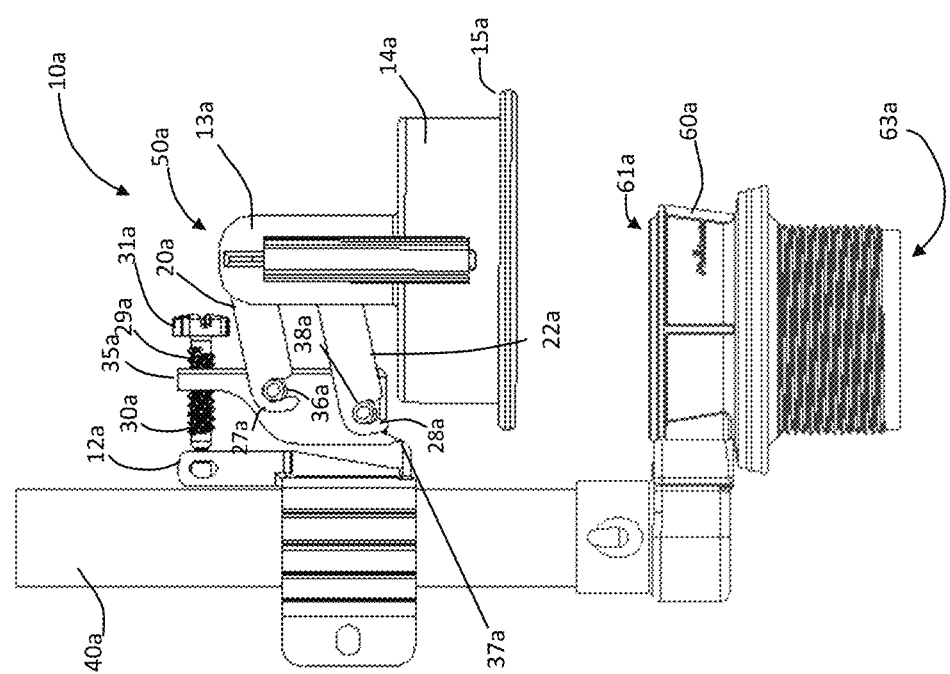
FIG. 4A is a side elevation view corresponding to FIG. 1A with the flapper canister in a raised position (thereby permitting a flush) in accordance with some embodiments of the invention.

In some embodiments, the effect of repositioning the support 35a, 35b on the connector 16a, 16b can be seen by comparing FIGS. 1A and 1B, and FIGS. 4A and 4B, where, for example, in FIGS. 1A and 4A, the support 35a is positioned towards the middle of the center of the thread 30a providing a gap between the support 35a and the head 31a. In this instance, the flange 15a is positioned generally horizontally and parallel to the flush valve orifice 61a. In reference to FIGS. 1B and 4B, the support 35b is positioned proximate the thread 30b in this non-limiting embodiment. In this instance, the flapper canister 14b is tilted, with the flange 15b is positioned generally parallel to an angled flush valve orifice 61b. Further, FIG. 5A is a perspective view of this embodiment having the adjustment mechanism that varies the angle of the flapper canister 14b, and FIG. 5B is a side elevation view corresponding to FIG. 5A.

Although not shown, in some other embodiments, the sockets can include slots to enable the bars 20a, 20b, 22a, 22b to be adjusted on the pivot. In some embodiments, the adjustment can be made by sliding the position of a connector (e.g., 16a, 16b) to a specific position within one or more slots of the socket.

Figure 2B:
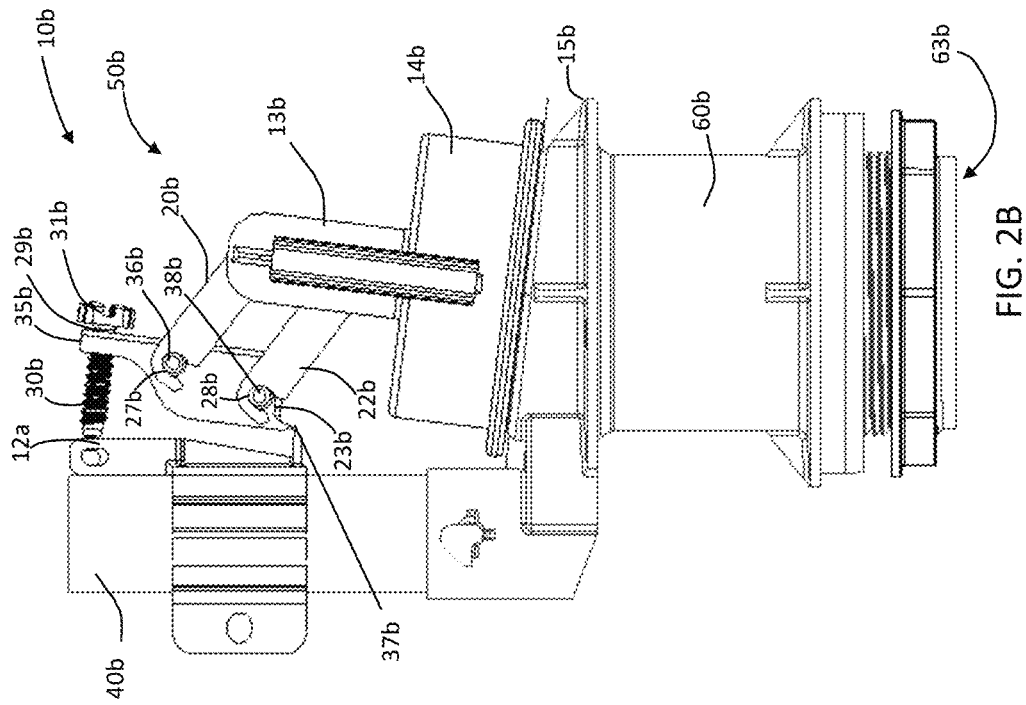
FIG. 2B is a side elevation view corresponding to FIG. 1B with the flapper canister in a lowered position (thereby sealing the flush valve) in accordance with some embodiments of the invention.
Figure 2A:
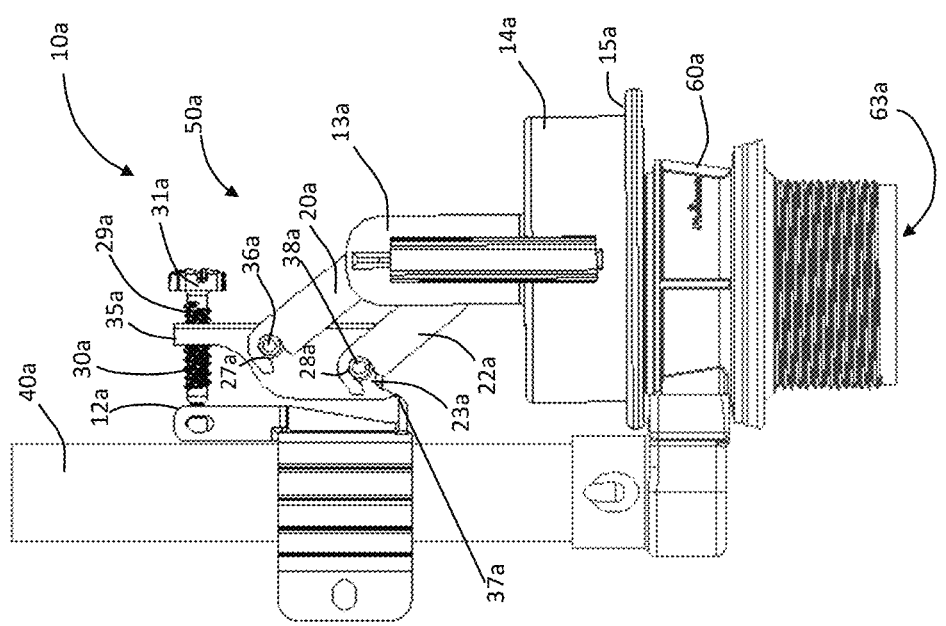
FIG. 2A is a side elevation view corresponding to FIG. 1A with the flapper canister in a lowered position (thereby sealing the flush valve) in accordance with some embodiments of the invention.
Figure 3B:
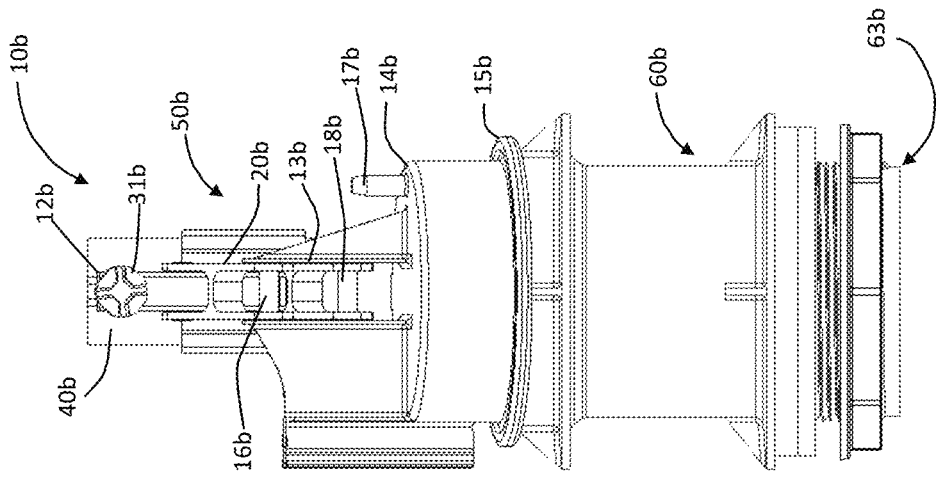
FIG. 3B is a side elevation view corresponding to FIG. 1B with the flapper canister in a lowered position (thereby sealing the flush valve) in accordance with some embodiments of the invention.
Figure 3A:
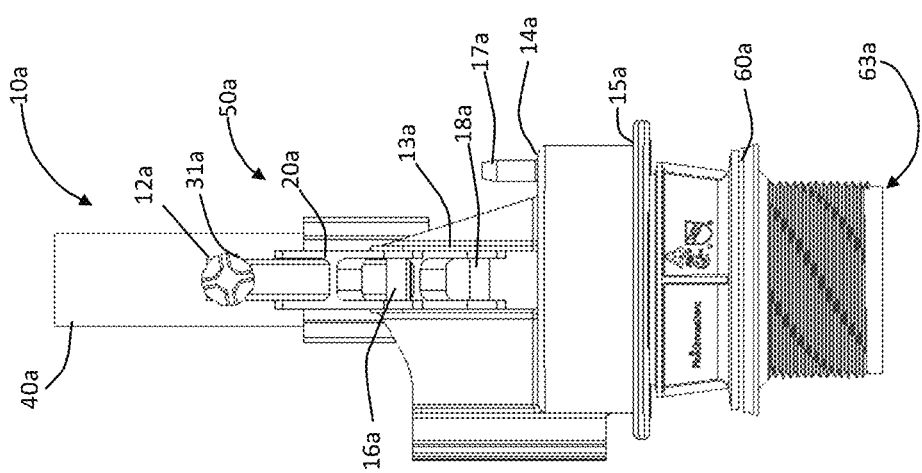
FIG. 3A is a side elevation view corresponding to FIG. 1A with the flapper canister in a lowered position (thereby sealing the flush valve) in accordance with some embodiments of the invention.

FIGS. 2A and 2B show side elevation views corresponding to FIGS. 1A and 1B respectively with the flapper canister 14a, 14b shown in a fully lowered position. Further, FIG. 3A is a front view corresponding to FIG. 1A with the flapper canister 14a in a lowered position (thereby sealing the flush valve) in accordance with some embodiments of the invention, and FIG. 3B is a front view corresponding to FIG. 1B with the flapper canister 14b in a lowered position (thereby sealing the flush valve) in accordance with some embodiments of the invention. FIGS. 4A and 4B show the flapper canister 14a, 14b in a fully raised position. (Note: the flapper canister 14a, 14b is typically raised by a chain (not shown) connected onto the top of the flapper canister 14a, 14b (or alternatively onto the top parallel bar 20a, 20b). As such, flapper canister 14a, 14b can be raised by the same mechanism that would raise a conventional flapper).

In some embodiments, flush valve 60a, 60b can comprise an open top orifice 61a, 61b and an open bottom orifice 63a, 63b, and an overflow tube 40a, 40b extending upwardly from the flush valve 60a, 60b. As can be seen, in some embodiments, the pair of bars 20a, 20b and 22a, 22b can rotate to raise or lower flapper canister 14a, 14b (while ensuring that flange 15a, 15b remains substantially parallel to top orifice 61a, 61b of flush valve 60a, 60b). As can be seen in FIGS. 5A, 5B, and partially seen in FIG. 1B, in some embodiments, the pair of parallel bars 20b and 22b can be connected to a pair of posts 16b on flapper canister 14b. As can be seen by comparing FIG. 2A to 4A or by comparing FIG. 2B to 4B, one advantage of the disclosed system is that flapper canister 14a, 14b can be held at the same angle with respect to the flush valve 60a, 60b as it is raised or lowered. As such, flange 15a, 15b can be kept parallel to top orifice 61a, 61b of flush valve 60a, 60b at all times. Further, the above disclosed arrangements, where the flapper canister 14a, 14b can be angled provides the ability for the flapper canister 14a, 14b to be positioned over flush valve openings with various or differing opening angles. Moreover, in some embodiments of the invention, an advantage of this system is that flapper canister 14a, 14b does not block the flow into top orifice 61a, 61b during a flush. Instead, the water from the fluid valve tank (surrounding flush valve 60a, 60b) can enter top orifice 61a, 61b at the same time, and with substantially the same volume from all sides of the orifice.

In reference to FIGS. 3A and 3B, some embodiments include a buoyancy control tube 17a, 17b extending from an upper surface of the flapper canister 14a, 14b. In some embodiments, the buoyancy control tube 17a, 17b can provide a fluid coupling between one side of the flapper canister 14a, 14b to an opposite side. For example, in some embodiments, the buoyancy control tube 17a, 17b can comprise a fluid aperture extending from one end of the buoyancy control tube 17a, 17b to an opposite end of the buoyancy control tube 17a, 17b, and thus from the upper side of the flapper canister 14a, 14b to an opposite (flush valve side) of the flapper canister 14a, 14b. In some embodiments of the invention, the buoyancy control tube 17a, 17b can provide a buoyancy-assist to the position or motion of the flapper canister 14a, 14b.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A fluid valve control assembly comprising:
    a flapper coupled to a linkage assembly, the linkage assembly comprising:
        at least one extension coupled or integrated with the flapper;
        at least one first connector coupled to the at least one extension;
        at least one linkage rotatably coupled to the at least one first connector at one end, and to at least one second connector at an opposite end, the at least one second connector rotatably coupled to a support of a mount;
    at least one flush valve comprising a top orifice;

wherein the flapper and the at least one extension are configured and arranged to be raised, lowered, and/or pivoted by rotating the at least one linkage about the at least one first connector and the at least one second connector;

wherein the linkage assembly is configured to enable the flapper to remain substantially parallel to the top orifice as the flapper is raised and lowered; and wherein in the lowered position, the flapper is configured and arranged to prevent a fluid flow into the top orifice.

2. The fluid valve control assembly of claim 1, wherein the flapper comprises a flapper canister.

3. The fluid valve control assembly of claim 2, wherein the flapper is at least partially hollow.

4. The fluid valve control assembly of claim 2, wherein the flapper canister has an open bottom end.

5. The fluid valve control assembly of claim 2, wherein the bottom end of the flapper canister comprises a flange dimensioned to be positioned over an orifice of a flush valve.

6. The fluid valve control assembly of claim 1, wherein the mount is configured as an overflow tube mount and configured to be mounted to an overflow tube.

7. The fluid valve control assembly of claim 1, wherein the at least one linkage comprises at least one pair of bars.

8. The fluid valve control assembly of claim 7, wherein at least two bars of the at least one pairs of bars are substantially parallel.

9. The fluid valve control assembly of claim 8, wherein the at least two bars are configured and arranged to remain parallel when rotating the at least one linkage about the at least one first connector and the at least one second connector.

10. The fluid valve control assembly of claim 1, further comprising an adjustment screw positioned through an aperture of the support, the adjustment screw coupled to the mount.

11. The fluid valve control assembly of claim 10, wherein the support is coupled to the mount by a hinge, the hinge configured and arranged to enable the support to rotate or pivot about the hinge.

12. The fluid valve control assembly of claim 11, wherein upon rotation of the adjustment screw, the support is configured and arranged to move along a thread of the adjustment screw and to rotate or pivot about the hinge, the movement resulting in a change of the angle of the flapper with respect to the mount or any surface or structure to which the mount is mounted.

13. The fluid valve control assembly of claim 11, wherein the hinge comprises a living hinge.

14. The fluid valve control assembly of claim 1, further comprising an overflow tube extending upwardly from the flush valve.

15. The fluid valve control assembly of claim 1, wherein the flapper includes a flange.

16. The fluid valve control assembly of claim 15, wherein the flange is configured to at least partially seal a flush valve orifice when the flapper lowered using the linkage assembly.

17. The fluid valve assembly of claim 1, wherein the flapper includes a buoyancy control tube extending from an upper surface of the flapper, the buoyancy control tube providing a fluid coupling between one side of the flapper to an opposite side.

18. The fluid valve assembly of claim 17, wherein the buoyancy control tube is configured to provide a buoyancy-assist to the position or motion of the flapper.

19. A fluid control assembly comprising:
a flapper canister;
at least one linkage rotatably coupled to the flapper canister and a support of a mount;
an adjustment screw positioned coupled to the mount and through the support;
wherein the flapper canister is configured and arranged to be raised, lowered, and/or pivoted by rotating the at least one linkage about pivots coupled to the flapper canister and the support; and
wherein upon rotation of the adjustment screw, the support is configured and arranged to move along a thread of the adjustment screw resulting in a change of an angle of the flapper canister with respect to the mount.

20. The assembly of claim 19, wherein the at least one linkage comprises at least one pair of bars.

21. The assembly of claim 20, wherein at least two bars of the at least one pairs of bars are substantially parallel and remain substantially parallel when rotating the at least one linkage about the pivots.

22. The assembly of claim 19, further comprising a flush valve having an open top orifice and an open bottom orifice, and an overflow tube extending upwardly from the flush valve; wherein the at least one linkage is configured to enable the flapper canister to remain substantially parallel to the open top orifice of the flush valve as the flapper canister is raised and lowered.

23. The assembly of claim 19, wherein the support is coupled to the mount by a motion-providing assembly, the motion providing assembly configured and arranged to enable the support to rotate or pivot with respect to the mount.

24. The assembly of claim 23, wherein the motion-providing assembly comprises at least one of a conventional hinge, a living hinge, a screw, an axle, a pivot, a link, a bearing, and a roller.

25. The assembly of claim 19, wherein the flapper canister includes a buoyancy control tube extending from an upper surface of the flapper canister, the buoyancy control tube providing a fluid coupling between one side of the flapper canister to an opposite side.

26. The assembly of claim 25, wherein the buoyancy control tube is configured to provide a buoyancy-assist to the position or motion of the flapper canister.

* * * * *